(12) United States Patent
Beyer

(10) Patent No.: US 10,941,875 B2
(45) Date of Patent: Mar. 9, 2021

(54) VALVE COMPRISING A VARIABLE FLOW OPENING

(71) Applicant: Hans-Jörgen Beyer, Rottenburg (DE)

(72) Inventor: Hans-Jörgen Beyer, Rottenburg (DE)

(*) Notice: Subject to any disclaimer, the term of this patent is extended or adjusted under 35 U.S.C. 154(b) by 134 days.

(21) Appl. No.: 16/233,184

(22) Filed: Dec. 27, 2018

(65) Prior Publication Data

US 2019/0170268 A1 Jun. 6, 2019

Related U.S. Application Data

(63) Continuation of application No. 15/110,291, filed as application No. PCT/DE2015/100013 on Jan. 8, 2015, now abandoned.

(30) Foreign Application Priority Data

Jan. 9, 2014 (DE) ..................... 10 2014 000 071.0

(51) Int. Cl.
*F16K 31/08* (2006.01)
*F16K 1/14* (2006.01)

(52) U.S. Cl.
CPC .............. *F16K 31/084* (2013.01); *F16K 1/14* (2013.01); *F16K 31/08* (2013.01)

(58) Field of Classification Search
CPC ...... F16K 31/086; F16K 31/082; F16K 31/08; F16K 31/084; F16K 1/14
See application file for complete search history.

(56) References Cited

U.S. PATENT DOCUMENTS

| 4,261,485 | A | | 4/1981 | Borg |
| 4,300,489 | A | | 11/1981 | Perrin |
| 4,349,042 | A | * | 9/1982 | Shimizu ................ F16K 31/084 137/39 |
| 4,489,863 | A | | 12/1984 | Horchos et al. |
| 5,121,329 | A | * | 6/1992 | Crump ............... G05B 19/4099 700/119 |
| 6,044,865 | A | | 4/2000 | Kreitmayr et al. |
| 6,199,587 | B1 | | 3/2001 | Shlomi et al. |

(Continued)

FOREIGN PATENT DOCUMENTS

| DE | 199 22 414 C1 | 11/2000 |
| DE | 202 02 381 U1 | 8/2002 |

(Continued)

OTHER PUBLICATIONS

International Search Report for corresponding International Application No. PCT/DE2015/100013, dated Jun. 24, 2015.

*Primary Examiner* — Mary E McManmon
*Assistant Examiner* — Andrew J Rost
(74) *Attorney, Agent, or Firm* — Renner, Otto, Boisselle & Sklar, LLP

(57) ABSTRACT

A method and apparatus for metering fluids, in particular liquid fluids, includes at least one fluid being guided out of at least one fluid reservoir through a closeable valve device in a discharge direction, at least one valve opening in the valve device being closed or opened by a valve closing member in order for the fluid to flow or be prevented from flowing through the valve opening, the opening and closing movement being performed magnetically by moving the valve closing member, which is arranged and moved in the fluid reservoir on an upstream side of the valve opening.

21 Claims, 4 Drawing Sheets

(56) References Cited

U.S. PATENT DOCUMENTS

| | | | |
|---|---|---|---|
| 6,669,909 B2 * | 12/2003 | Shvets | B01L 3/0265 |
| | | | 137/487.5 |
| 6,919,067 B2 | 7/2005 | Filler et al. | |
| 7,168,597 B1 | 1/2007 | Jones et al. | |
| 7,320,456 B2 | 1/2008 | Yajima | |
| 7,438,858 B2 * | 10/2008 | Shvets | B01L 3/0265 |
| | | | 251/129.08 |
| 7,726,524 B2 | 6/2010 | Merabet et al. | |
| 7,980,197 B2 * | 7/2011 | Prentice | B05C 5/0225 |
| | | | 118/688 |
| 8,424,720 B2 * | 4/2013 | Tracy | F04B 17/03 |
| | | | 222/1 |
| 9,080,686 B2 | 7/2015 | Hoppe et al. | |
| 9,091,354 B2 | 7/2015 | Schlenker et al. | |
| 2003/0221616 A1 * | 12/2003 | Carpenter | F16K 31/086 |
| | | | 118/715 |
| 2005/0139796 A1 | 6/2005 | Altonji | |
| 2008/0227663 A1 * | 9/2008 | Tisone | C12M 41/00 |
| | | | 506/39 |

FOREIGN PATENT DOCUMENTS

| | | |
|---|---|---|
| DE | 10 2007 029 064 A1 | 12/2008 |
| DE | 10 2010 034 761 A1 | 2/2012 |
| EP | 2283264 A1 | 2/2011 |
| WO | 2012/022423 A1 | 2/2012 |

\* cited by examiner

VALVE COMPRISING A VARIABLE FLOW OPENING

TECHNICAL FIELD OF THE INVENTION

The invention relates to a valve for the flow of media, fluids and gases, wherein for an infinitely variable flow opening for variable flow of media, a freely movable body is deflected against a flow direction in a flow space via magnets spaced apart and variable outside the flow space, thus enabling a variably metered media transfer as a line or point without dripping onto a substrate.

The invention further relates to the micro-adjustment of the flow of media through the valve and integration in metering systems and pens.

DESCRIPTION OF THE RELATED ART

Known magnetic valves with moving bodies to open or close a valve are based on either electrical magnetic field excitation, on generated pressure differences in the flow direction, or function by means of springs or with holding forces of multiple magnetizable or magnetized elements within a media-carrying valve body, such as a section of a hollow channel, where e.g. an element is movable by means of pressurization of media in the flow direction. Such valves are known from DE 199 22 414 C1 and EP 2 283 264 B1, as well as the corresponding prior art.

Valves based on electrical magnetic field excitation are technically complex and costly in terms of energy consumption. The magnetic flux density changes depending on a sequence of magnetic field strengths over time. Frequencies and switching cycles influence the flow behavior of media via the heating of valves and media flowing therethrough with viscosity changes. Grooves and joints in valve bodies are confounding factors posing a potential risk for leaks, which affect the flow behavior of a medium. Built-in springs are resistances which must be overcome, and which modify the flow of a medium. Valves with metal surfaces in the flow space are not very suitable for aggressive media, e.g. also for cyanoacrylates, as they endanger the valve.

Valves which open or close a valve by means of budding up or reducing pressure, or which require a prior increase in pressure via the medium, continually change the flow behavior of a medium due to discontinuous pressure conditions in the system. However, a qualitative and reproducible discharge of media can only be achieved under constant pressure conditions of the medium and the applied pressure, as well as the same flow behavior of the medium.

Through their structure and through areas in which air bubbles can form or collect, valves influence the flow behavior of a medium downstream from the valve.

SUMMARY OF THE INVENTION

The object of the invention is to provide a simple and cost-effective valve through which a medium can flow virtually undisturbed, which is media-compatible, i.e. also suitable for media such as cyanoacrylate or for aggressive media, and by means of which it is possible to transfer arbitrarily long lines to a substrate with a predetermined formation of the beginning and end of a line, without errors and in the desired manner, at any time intervals, including long term intervals, and in reproducible quality, and wherein dripping subsequent to a metering procedure can be excluded. In addition, a medium within the valve must not be able to react in such a manner as to create a risk for the valve to become unusable. In addition, the objective is that the valve can be easily installed in a metering system even without specific knowledge of the metering system, or that an automated variable transfer of a medium will be simplified.

These requirements are met in accordance with the invention by means of the patent claims.

DETAILED DESCRIPTION OF THE INVENTION

The fundamental elements of the valve in accordance with the invention are described in further detail in excerpt form by means of simple schematic drawings, not to scale, to explain the interactions between the individual components for the functioning of the valve.

Figure 2:
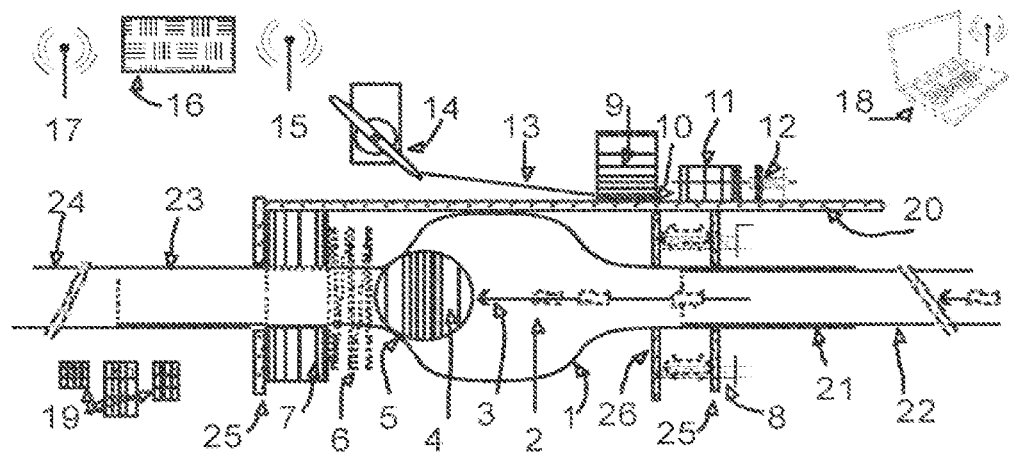
FIG. 2 shows the basic structure of a valve in its closed state.

FIG. 2 shows the basic structure of a valve in its closed state, with external elements and peripheral devices.

In a hollow body 1, a freely movable ferromagnetic sphere 4 is pressurized via a medium 2 in the direction of flow 3. The sphere is drawn against a depression 5 as a media-tight contact surface by an external magnet 7, which can be adjusted abutting to the hollow body by means of a non-magnetizable spring 6 and elements 8 and a stop 26, and can be moved to a new position via an external magnet 9, which, if required, is supported on a spacer and mounting element 20 via an air cushion 10, in a variable position, with a connection 13 to a motor 14, which can be controlled, if required, using controllers 16 and radio links 15, 17 and computer software 18, if required, with the aid of measurement and sensor technology 19.

A reset magnet 11 which supports a movement of the magnet 9 can be positioned by means of an adjustable setting 12. Via the connections 21, 23 of the hollow body 1, which can be affixed to an element 20 by means of bars or clips 25, further connections 22, 24 of a metering system can be attached.

Figure 3:
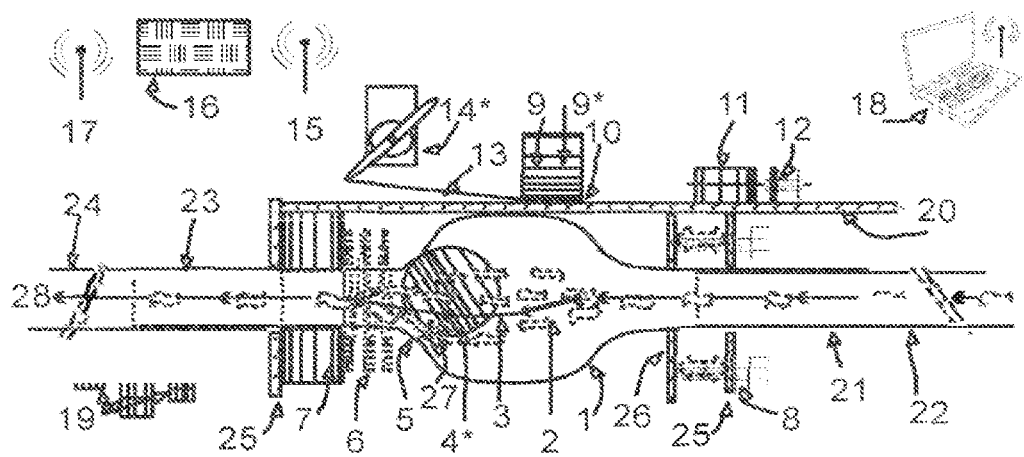
FIG. 3 depicts in the valve a sphere, a motor and an external magnet are in new positions, creating a flow opening through which a medium can flow in the direction of a metering pore or metering pin.

FIG. 3 depicts in the valve the sphere 4, which is deflected from a media-tight depression and contact surface 5 with the aid of a new motor position 14* and a resulting new position 9* of an external magnet 9 with a concomitant exertion of magnetic force such that the sphere 4 is displaced to a new, modified position 4*, such that a flow opening 27 is created, through which the medium 2 can flow in accordance with the direction of flow 3 in the direction of a metering pore 28 or metering pin (not depicted).

Figure 4:
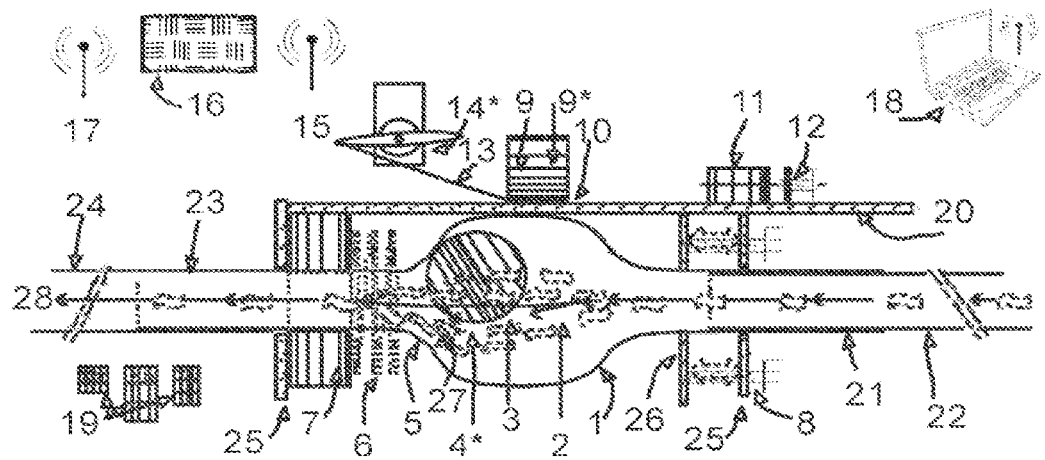
FIG. 4 shows the valve with a new variably controllable, now larger flow opening.

FIG. 4 shows the valve with a new variably controllable, now larger flow opening 27 as a function of a new motor position 14* in conjunction with a new position 9* of the external magnet.

Figure 5:
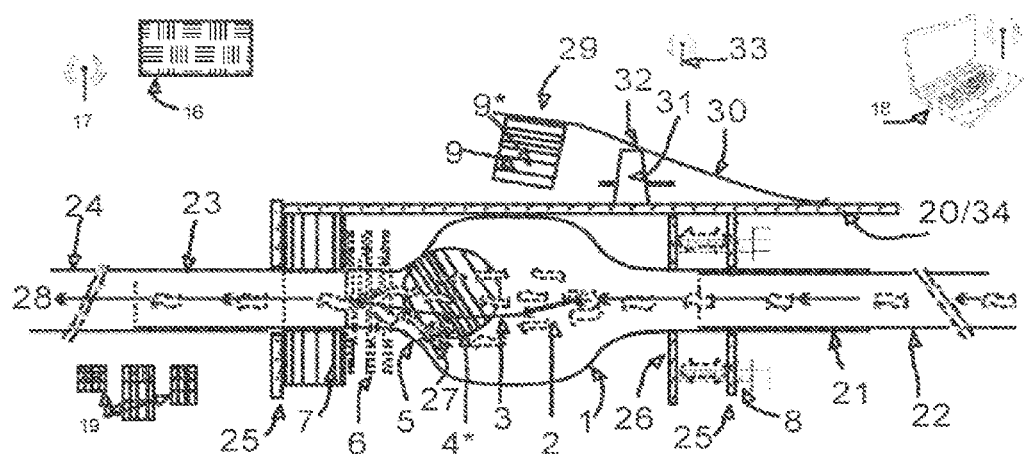
FIG. 5 shows the valve in which the external magnet is moved into a new position, for example, by means of a spring and a compression movement.

FIG. 5 shows the valve shown in an embodiment in which the external magnet 9 is moved into a new position 9* for example manually by means of a spring 30 and a compression movement 29, and the magnet 9 displaces the sphere to a new position 4*.

For specific flow openings 27, a stop 31 may be positioned, which can simultaneously act as a switch 32 upon contact between the spring 30 and the stop 31, so that further process can thereby also be activated, for example by means of a radio link 33.

Figure 6:
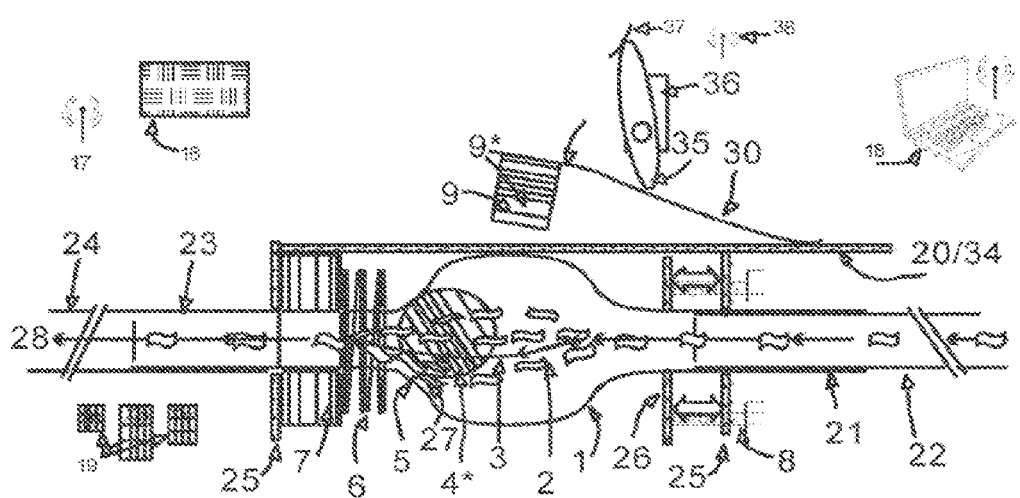
FIG. 6 depicts the valve in which the flow opening relates to a movable element attached to an assembly and mechanically rotatable, for example, by sliders.

FIG. 6 depicts the valve in an embodiment in which a variable flow opening element 27 relates to a movable element 35, which is attached to an assembly 36 and moves a magnet 9 into a modified position 9* by means of a spring 30, which effects a displacement of the sphere 4 via its magnetic force, where the element 35 is also mechanically rotatable for example by sliders 37 inside an automation, and the array can also be controlled via radio signals 38.

The object of the present invention relates to a method for the metering of fluids, in particular liquid fluids, wherein at least one fluid is conducted from at least one fluid reservoir in a discharge direction through a closable valve device, wherein at least one valve opening of the valve device is closed or opened by means of a valve closing body in order to guide the fluid through the valve opening or to block conduction, wherein the opening or closing is magnetically performed by moving the valve closing body, and the valve-closing body is arranged and moved in the fluid reservoir on an upstream side of the valve opening. In one embodiment it is provided that the valve closing body is moved by means of at least one magnet, which is arranged at a distance from the valve closing body cooperating with the magnet, by way of moving and/or modifying its magnetic field strength.

In another embodiment, it is provided that the valve closing body is moved in a guided or unguided manner.

Yet another embodiment provides that a cyanoacrylate is used as the fluid.

In addition, the technical teaching of the present invention provides that, in a metering device for metering fluids, in particular liquid fluids, means for carrying out the method described above are present, in particular with a fluid reservoir which is adapted to receive the fluids, which has at least one closable valve device in a discharge direction through which the fluid can be conducted, wherein the valve device has at least one valve opening which can be closed or opened by means of at least one valve closing body in order to conduct the fluid through the valve opening or block conduction, wherein, in addition, at least one magnetic actuator is provided to magnetically perform the opening and closing actions by moving the valve-closing body, and which is arranged at least one valve-closing body on an upstream side of the valve port in the fluid reservoir and movable.

In one embodiment of the present invention, it is provided that at least one associated magnet is provided at a distance from the valve closing body, where the magnet is movable in relation to the valve closing body and/or is changeable at least with regard to its field strength.

In another embodiment, it is provided that the valve closing body has a guide for guided movement, or is arranged such as to be movable without guidance.

Yet another embodiment provides that cyanoacrylate is provided as a fluid.

The valve device incorporates a valve seat. The valve seat against which the valve closing body bears for closing may be of any shape. In one embodiment, a funnel-shaped embodiment is provided. In another embodiment, a planar surface is provided. The valve seat has the valve opening which can be closed by means of the valve closing body. In particular, a non-funnel-shaped guide or a non-funnel-shaped valve seat is provided.

Flexible material properties of the valve seat allow a tight seal on the valve closing body.

In addition, the technical teaching of the present invention provides for the use of a metering device as described above for the metering of fluids, especially gaseous and/or liquid fluids, in particular for drip-free metering. The metering device may be used in any number of devices.

In one embodiment, the valve closing body is arranged in a magnetic field. The field is preferably formed by two magnets spaced at a distance from one another. By moving one and/or both magnets, the field or field strength acting on the valve closing body can be changed. In this way, a movement of the valve closing body in the resulting magnetic field can be effected. The valve device and/or the valve seat are preferably arranged in the magnetic field. One magnet is accordingly arranged before the valve seat in the flow direction and one magnet is arranged behind the valve seat. The valve seat is preferably not magnetizable. The valve closing body is magnetizable, or can be moved by means of the magnetic field forces. A preferred embodiment thus provides for at least two magnetic field generating magnets. The magnets are attachable in the reservoir and/or outside the reservoir. The valve closing body is arranged within the reservoir. The valve seat and the valve closing body are in operative connection, as are the magnet and the valve closing body. The valve seat is formed in one embodiment of a rigid and/or inflexible material. In a preferred embodiment, the valve seat is formed of a flexible and/or elastic material, so that a better seal with the valve closing body can be achieved. In accordance with the invention, the valve is preferably constructed such that preferably an axial and undisturbed, non-magnetic hollow body contains a medium, which is supplied to the hollow body and can flow on through an opening or leak in the hollow body. Advantageously, this hollow body consists of a material that is chosen to fit the medium and the function of the valve.

The hollow body contains a medium and a freely movable body, preferably in the form of a sphere made of ferromagnetic material, which, due to its size, is suitable both for tightly closing the opening of the hollow body and variably permitting the flowing through of the medium, depending on the deflection of the movable body. The ferromagnetic body may be provided with a medium-compatible protective layer and surface, e.g. Teflon, to optimize its functioning.

The function of the hollow body as a valve is on the one hand achieved in that the freely movable body is pulled toward the opening of the hollow body, preferably via adjustable magnetic attraction forces arranged outside the hollow body, below the valve opening of the hollow body in the flow direction, preferably permanent magnetic attraction forces of a ring magnet, the inner ring of which should have a larger cross-section that the opening of the hollow body, so that it can encompass a tapering of the hollow body sized to fit the diameter of the opening of the hollow body. In consequence, the body closes the opening so that fluid cannot pass through. On the other hand, the body can be positioned at a distance from the opening, in that movably arranged magnetic attraction forces also act upon it, preferably permanent magnetic attraction forces arranged outside the hollow body, which act against the flow direction depending on the distance and proximity of the external magnet. These forces can be larger than the attraction forces on the freely movable body in the flow direction, as well as a pressure acting on the body via the medium in the flow direction, which also pushes the movable body against the opening.

A pressure greater than the atmospheric pressure is applied to the movable body via a medium in the hollow body. The medium itself is under a specified constant pressure for steady flow behavior, pushing the movable body against the opening of the hollow body. Through effecting a minimal change in the position of the movable body relative to the opening of the hollow body, comparable to an imperfect seal of the hollow body and flow/valve opening, a medium can escape the hollow body for a metering process even in the case of small differences in pressure between the pressure inside the hollow body and the surrounding e.g. atmospheric pressure, and in accordance with the viscosity of a medium and the position of the movable body inside the hollow body with regard to the opening, and depending on the magnetic attraction forces of an external ring magnet below the flow opening and the proximity of an additional external magnet.

As a general principle, the pressure relationships in a system change when a medium escapes from a valve or metering pore. A reproducible exit of the medium and a specified metering quality is achieved by the valve in accordance with the invention in that the attraction forces acting on the ferromagnetic movable body in the hollow body are manually or magnetically regulated in the direction and against the flow direction by external magnets, such that variable flow openings are created via the resulting gap between the freely movable body and the opening of the hollow body by means of which the flow of a medium through the valve can be variably adjusted.

A variable position of the external magnets, and thus a variable flow opening, can preferably be programmed using software, and implemented together with controllers and movement elements.

This has the great advantage that, even without knowing the exact relative forces and non-linear processes, the quality and type of a media application, and thus the success of an intended media transfer, can be directly evaluated after the flow of the medium through the flow opening and after its exit from a metering pore and transfer to a substrate, and the position of the external magnets can be corrected and adjusted as it is necessary for a subsequent transfer of the medium, if required by the metering application, making use of the preprogrammed values. A correction can be performed manually on the basis of a visual assessment, or automatically using measuring and sensor technology. In this way, variable flow openings are formed during a metering process for an adapted flow of the medium for an optimal metering result on a substrate. The respective flow openings are in accordance with the result of a media transfer.

Values and settings recognized as correct values and settings can be saved, archived for subsequent metering processes, accessed at will, or combined. In addition, other factors such as viscosity, flow properties of the medium, temperature, barometric pressure and humidity changes and other parameters can be recorded using measurement and sensor technology, transmitted to the software for precise micro-metering, and evaluated and processed by the software for the exact positioning of the external magnets.

A programmed and positionable change in the position of permanent magnets for variable forces acting on a ferromagnetic body inside a hollow body is preferably achieved via controllable stepper motors, servo motors and microcontrollers. The magnets are mounted either directly on the motors or at a distance from but connected to the motors, with poles ae being considered. This can be advantageous if it is required by the local conditions, if the immediate size of the valve and weight should be minimized, if additional transmissions for the deflection of the magnets are advantageous, or if the magnetic fields of the magnets influence the motors.

At the same time, this ensures that the valve body and medium cannot be heated via the motors.

An advantageous, fast reacting option for positioning an external magnet for a deflection in the direction of the body inside the hollow body can be achieved in that a permanent magnet with a servo motor, ideally equipped with air bearings to minimize frictional resistance, is moved in the direction of the movable body as programmed, but the repositioning of the magnet to a new position more distant from the body movably mounted in the hollow body is achieved without power from the servo motor via magnetic attraction forces, preferably from a permanent magnet, acting on the movable permanent magnets against the deflection via the servo motor. In this case, the connection between the servo motor and the permanent magnets to be positioned does not require a rigid connection, and the servo motor can rapidly move itself without additional mass to a new preprogrammed position further spaced apart from the movable body.

The acting magnetic forces can influence one another and be finely adjusted in accordance with an adjustable distance between the reset magnet and the movable permanent magnets in a starting position.

The attraction forces must be adjusted with regard to one another according to a fine tuning of the distances between the freely movable body inside the hollow body and the external magnets which pull the freely movable body against the opening of the hollow body in the flow direction. This is facilitated if a spring, e.g. of plastic, is arranged between the hollow body and the external magnet outside and below the opening of the hollow body, which spring is able to stabilize the external magnet in a fixed position relative to the hollow body, in that e.g. the hollow body is adjusted against the spring, e.g. via its mounting.

A targeted deflection of the ferromagnetic body inside the hollow body can also be achieved if both the external magnet beneath the hollow body, below the flow port, and the movable permanent magnet are moved simultaneously and in coronation. This can be useful in specific embodiments of the valve.

In all cases it must be ensured that there is be no direct contact between movable and immovable permanent magnets, including commercially available and suitable permanent magnets, preferably made magnetically "hard" material. The hollow body preferably consists of non-magnetizable material, and is preferably made of material-friendly plastics. In order to prevent contact, it must be ensured that magnets may not come close to each other, so that contact is compulsorily. This can easily be achieved through the use of spacers, e.g. of plastics, to which e.g. the hollow body can also be mounted using non-magnetizable bars or dips.

One variant of the construction for metering media is ideal for metering pens. For example, a cylindrical hollow body having a magnetic or ferromagnetic body may be formed above the movement space of the body and against the flow direction of the medium, also with a crimp favorable to the flow of the medium, in which an external magnet, preferably within the radius of the hollow body, can be arranged for changing the position of the movable body in the hollow body and can manually be moved and positioned or can be moved and positioned via a following movement element, to that, as previously described, a variable flow opening can be generated in connection with a magnet below the hollow body as a counterforce to the variably movable body inside the hollow body in accordance with the corresponding positioning of the magnets.

A further possible variant functions with a hollow axis of the movement element, through which the medium directly flows, but preferably flows through a hollow body in the hollow axis that continues as a hose, and the external magnet, which can also be arranged around the axis as a ring magnet, is positioned above the motor. For an undisturbed operation of metering pens, a movement element in a metering pen may be controlled via a controller through radio link or integrated storage media for variable and reproducible metering quantities, and a power supply may be provided in the pen.

In a manually performed positioning of external magnets that can deflect a movable body inside the hollow body, e.g. stops, e.g. for levers to which permanent magnets may alternatively be attached directly, can be adjusted, so that identical metering results are possible in connection with a unit time.

Figure 1:
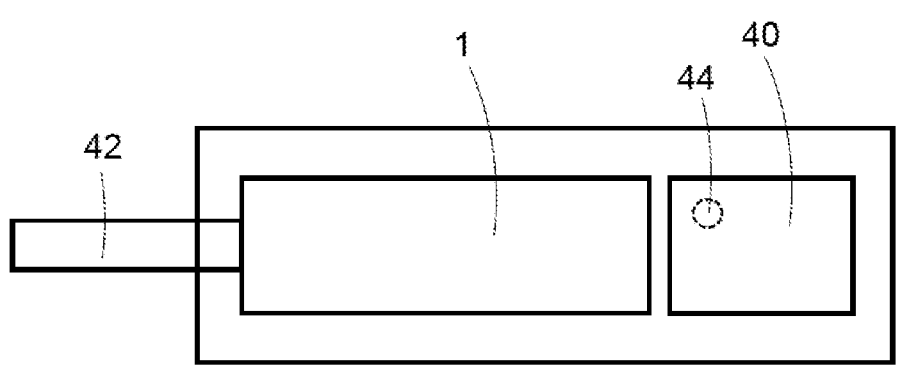
FIG. 1 shows a schematic view of a valve with a replaceable cartridge.

As shown in FIG. 1, for metering pens, the hollow body 1 including the movable body and medium can also be integrated into a metering pen as a replaceable cartridge, where pressure is exerted on the medium directly or indirectly, e.g. also via a replaceable pressure cartridge 40 in the metering pen, or the pressure is applied to the medium via a manual pressure build-up generated in the metering pen.

Advantageously, however, in the case of metering pens in which the medium does not flow into the pen through lines, the medium is metered from an inserted disposable media cartridge without a moving body being inserted in the media cartridge or indirectly, via a metering pressure applied in accordance with the invention using the valve of the invention or a valve according to the invention, in the flow direction below a replaceable cartridge arranged between a connection of a metering pore 42 (FIG. 1) and an opening of a cartridge.

For media which must be dispensed mixed in certain proportions, such as reaction adhesives, a plurality of valves in accordance with the invention used together permit the various media to be combined in coordination with one another and programmed accordingly and discharged as a mixture through a common metering pore. The variably generated flow openings of the valves in accordance with the invention permit media to be metered with regard to one another such that, in the case of a continuous application of media through a common discharge pore, a mixed medium with different characteristics can be expelled which can assume different characteristics after being transferred to a substrate, for example softer or harder. This has the particular advantage that for example media to be dispensed can be metered differently according to the nature of their course, for example with different settings for a tight turn than in a straight line in order to prevent stress cracks. Reference has already been made to the possibility of creating lines of varying width of any length.

A non-magnetizable hollow body of the type required for the valve, i.e. adapted to media that is free of interference and fluid- and air-tight with an internal, freely movable body of ferromagnetic material, preferably a spherical permanent magnet, can be produced very easily. It is sufficient for the hollow body to be produced using familiar methods as a streamlined, non-sealed, preferably symmetrical ampoule of plastic material tapering toward the ends in which a sphere, for example a magnetic sphere, is inserted during production. At the same time, this sphere—due to its gravity and, if necessary, additional external magnetic forces acting on the sphere only during production—creates, during a suitable state of the plastic, while it is still warm, creates a preferably axial depression in the ampoule at the transition of the shape of the ampoule into a tapering, hollow end of the ampoule. With a suitable plastic material, the depression can be closed over the sphere in the direction of flow such as to be fluid-tight once the uniformly round sphere is pressed into it. Ideally, the outer diameter of the tapering hollow end of the ampoule below a flow opening of an ampoule is matched to an inner diameter of an external ring magnet which attracts the sphere inside the hollow body to the depression, and manufactured in a length such that the fine adjustment of the distance to and thus exertion of force on the sphere inside the hollow body by the external ring magnet is enabled, and a connection for conducting the medium after flowing through the ampoule is possible via the following cross-section of the end of the ampoule.

Permanently fluid- and air-tight connections with low resistance and effect on the flow of the medium can already be affected by means of suitable lengths and cross-sections of the ends of the ampoule, for example preferably by means of superimposed hoses after the medium has flowed through the valve, or preferably by means of hoses inserted in the direction of flow at the entrance to the valve. Other connection types can also be realized. If necessary, hollow bodies with multiple connection options can be produced, for example for allowing the influx of multiple media into the hollow body. The hollow body can likewise be produced using multiple parts or elements, though air-tightness must be ensured.

A valve function of the hollow body with an internal movable body is achieved by means of magnets arranged outside the hollow body, so that hollow bodies can be easily replaced in an array. This can be useful if differently shaped hollow bodies are used for different media with different characteristics and viscosities, or if, with the passage of time, a fluid-tight seal of the opening of the hollow body can no longer be achieved.

Due to the low cost of the hollow body, it will also be more economical to dispense with cleaning a hollow body and instead to simply replace it with a new hollow body. In this sense, the hollow body can be a disposable product that can be changed with respect to a base assembly of external magnets.

In the event of a change in the flow behavior of a medium, a correction for the discharge of the medium through a metering pore and the transfer of the medium to a substrate can be carried out via the stored software. If necessary, the position and change in position of a substrate during a unit time can simultaneously be taken into account and also coordinated.

In addition to the exemplary drawings, there are numerous variants.

Critical for functioning in accordance with the invention is a freely movable ferromagnetic body for a variable resistance for a medium in a fluid reservoir, for example in a hollow body. Magnetic forces act via magnets or ferromagnetic materials arranged outside the hollow body such that a magnetic or ferromagnetic body in the hollow body is pulled against an opening of the hollow body in the direction of flow, such that the medium is completely blocked from flowing through the opening. Depending on the distance of this retention power and its influence on the body inside the hollow body, a media-impermeable block can be adjustably modified into a permeable block such that the medium can escape through the resulting flow opening, depending on pressure conditions. It is advantageous for this to be used for adjusting the balance of force between the ferromagnetic body located inside the hollow and the external magnetic force, and to change the position of the body via a further external magnetic field acting on the body inside the hollow body in accordance with the flow behavior of the medium. With a real-time response, the flow opening varies with the position of the body for a direct and variably adjustable discharge of media.

A media flow will establish in accordance with the ambient pressure at the location of the media outlet, based on the surface tension of the medium and capillary forces and the resistance of the body inside the hollow body and of the system. In closed systems, a slight overpressure, which also allows overhead metering, for example in robot systems; in open systems, a pore 44 (FIG. 1) to the outside air for pressure equalization is sufficient, for example in self-sufficient metering pens.

The entry of outside air and pressure conditions can in turn be regulated for example by means of additional arrays in accordance with the invention in or against the direction of flow. At the same time, these can generate counter-impulses which modify the direction and effect of impulses on a medium which are transferred to the medium when the position of a freely movable body in the hollow body changes Impulses transferred to a medium via a movement of the body are small compared to systems based on changes in the pressure applied to a medium. Existing systems, for example compressed air systems, may however be used to position external magnets or ferromagnetic materials in an arrangement of external magnets in accordance with the invention, the magnetic fields of which can effect a change in the position of a ferromagnetic body inside the hollow body.

As soon as the medium and significant pressure changes, i.e. switching between overpressure and underpressure in the media-carrying lines, are no longer linked in the system, a nearly constant pressure on the medium can be set.

There are many different standard, commercially available media such as cyanoacrylates, adhesives in general, oils, cleaning solvents, spot removers, colors, fragrances, and flavorings, but also aggressive media, etc. offered in product-specific bottles or containers in which for example pressure must be manually applied to the container to expel the medium, and in which, when pressure is reduced, the medium withdraws into the container, usually with an uncontrolled influx of air through the media outlet. A precise and continuous metering of the medium is thus impossible. However, it is possible to retain such containers while replacing their closures with a valve functioning in accordance with the invention. Magnetic fields can be altered for modifiable variable metering processes with no expenditure of energy, either manually or using actuators, using guided ferromagnetic elements provided on adapters or metering pens, as well as elements attached for example to a finger. The approach in accordance with the invention requires no exertion of manual pressure on a container. Once the media flow has been released, the discharge of media is immediate, and media can be transferred to a substrate for example in the micro range of less than 0.09 mm, depending on the medium, and also for any duration, as long as the pressure within the system is greater than the ambient pressure. In general, media having a viscosity lower than that of water can accurately be metered without dripping. For example, fragrances can be variably released into a space over time and based on sensor inputs. It is cost-effective and simple to use variable metering for example for media dispensers or automated beverage dispensers. Here, for example, the insertion of a container beneath a discharge outlet or its subsequent removal, with their resultant influence on the magnetic fields of the arrays, can trigger a metering process even without electricity, or interrupt it directly without subsequent dripping; a media flow can also be restricted. Media flow in a hygienic manner, exclusively through a non-wearing, media-compatible line, for example made of Teflon, having no penetrations or contact with mechanical components. Lines are not subject to mechanical stresses, and can be realized in a manner impervious to diffusion.

This is particularly advantageous for applications in the fields of medical technology and life science for sterile and contamination-free metering processes. Quantities of media can be precisely metered. An increase in the volume of a meniscus can be interrupted or continued immediately. In micro-metering, the formation of a droplet, i.e. a minimal media flow, can be set through a unit time, even over several days.

In systems, line sections may additionally be provided as needed for sensitive media which for example in the case of self-sufficient metering pens for cyanoacrylates may be filled with desiccants. Surfaces can be passivated. Line sections can be designed such that they release substances into a medium flowing through them which can rapidly change the characteristics of a medium before it is discharged, or for example add flavorings or active ingredients to a fluid, for example in medical technology, for example also for the administering of medications.

For simple tasks, for example to insert containers in a hygienic manner without dripping, it is sufficient that a ferromagnetic closing body is present in the container and that a media flow is adjusted in accordance with the distance from an external magnetic or ferromagnetic component, or that such a flow is prevented. External magnetic components can be integrated for example into a counterpart to a container, or into a lid.

One embodiment provides for a valve with a variable flow opening and a freely movable sphere of ferromagnetic material in a hollow body pressurized via a medium in the direction of flow. To effect a change in the position of the sphere to interrupt the flow of a medium, it is attracted toward a media-tight contact surface in a hollow body in the direction of flow by at least one first permanent magnet. To effect a change in the position of the sphere to allow the flowing of a medium through a hollow body, it is pulled away from a media-tight contract surface in the hollow body by at least one movable second permanent magnet, which, at a suitable distance, acts on the sphere with a greater magnetic attractive force than the first magnet. Depending on the distance between and position of the second and first magnets with regard to one another, a variable media flow and variable flow opening can be generated, where the first permanent magnet and second permanent magnet are located outside the hollow body.

Another embodiment provides for a valve, wherein the position of at least one of the permanent magnets is changed manually.

Yet another embodiment provides for a valve, wherein the position of east one of the permanent magnets is changed by means of servos.

Another embodiment provides for a valve in which a change in position and position adjustment of at least one permanent magnet is carried out via control loops in conjunction with defined control commands.

In addition, in one embodiment, a valve is provided in which the latter is located in a metering pen.

The metering device is formed in one embodiment as a valve.

LIST OF REFERENCES

1 Hollow body ampoule/fluid reservoir
2 Medium/fluid
3 Direction of flow/outflow direction
4 Freely movable body/sphere/valve closing body
5 Depression—media-tight contact area
6 Spring, optional
7 First external magnet J magnet J magnetic actuator
8 Fine adjustment hollow body, optional
9 Second external, movable magnet
10 Air cushion, optional
11 Reset magnet, optional
12 Fine adjustment reset magnet, optional
13 Connection positionable magnet, symbolic
14 Moving element—Motor
15 Radio link for moving element and motor having optional controller
16 Controller, possibly optional
17 Radio link between controller and computer, optional
18 External computer, optional
19 Optional measurement technology—sensors
20 Spacer—fastener
21 Hollow ampoule end—inflowing medium
22 Connection inflowing medium
23 Hollow ampoule end—outflowing medium
24 Connection for outflowing medium
25 Mounting hollow body/vial, ampoule symbolic
26 Stop ampoule—fine adjustment, optional
27 Variable flow opening
28 Continuing metering pore metering needle
29 Pressure for change in position
30 Spring element
31 Stop for spring element, optional
32 Optional switch contact
33 Potential radio link
34 Distance surface, metering pen
35 Eccentric element
36 Bearing mount for eccentric element, optional movement element
37 Mechanism, optional
38 Radio link, optional
40 Pressure cartridge
42 Metering pore
44 Pore

The invention claimed is:

1. A metering pen for dispensing a medium having an adjusted flow rate onto a substrate, the metering pen comprising:
a hollow body containing the medium, the hollow body having a valve opening and a valve seat at an upstream side of the valve opening;
a metering pore at a downstream side of the valve opening configured to release the medium onto the substrate;
a movable body within the hollow body and arranged at an upstream side of the valve opening, the moveable body configured to close the valve opening and open the valve opening to control variably metered transfer of the medium through the valve opening and the metering pore and onto the substrate as a line or point onto the substrate, depending on a position of the movable body;
a plurality of magnets arranged outside the hollow body configured to change the position of the moveable body such that the moveable body moves into and out of engagement with the valve seat to cause the opening and closing of the valve opening,
wherein at least one magnet of the plurality of magnets is arranged at an upstream side of the valve seat and another magnet of the plurality of magnets is arranged at a downstream side of the valve seat.

2. The metering pen of claim 1, wherein the medium is supplied to the hollow body via a replaceable cartridge.

3. The metering pen of claim 1, wherein the hollow body includes a replaceable cartridge containing the medium and the movable body, the replaceable cartridge being insertable into the metering pen initially and subsequent to usage, and removable and disposable with the movable body therein.

4. The metering pen of claim 3, wherein the replaceable cartridge is arranged between an opening of the metering pore and an opening to the replaceable cartridge.

5. The metering pen of claim 4, wherein the replaceable cartridge has a non-magnetic hollow body and the moveable body therein comprises a magnetizable material.

6. The metering pen of claim 4, further comprising a replaceable pressure cartridge which exerts pressure on the medium within the replaceable cartridge.

7. The metering pen of claim 1, wherein the hollow body includes a pore to outside air for pressure equalization.

8. The metering pen of claim 1, wherein the hollow body includes connections for the influx of media.

9. The metering pen of claim 1, wherein the at least one magnet or another magnet is movable with respect to the movable body.

10. The metering pen of claim 9, wherein the movement of the at least one magnet or another magnet with respect to the moveable body is automated via control by a controller.

11. The metering pen of claim 9, wherein the at least one magnet or another magnet is motor driven.

12. The metering pen of claim 9, wherein the metering pen further includes a lever to which the at least one magnet or another magnet is attached.

13. The metering pen of claim 9, wherein the movement of the at least one magnet or another magnet with respect to the moveable body is driven by a finger.

14. The metering pen of claim 1, wherein the at least one magnet or another magnet is configured to have an adjustable field strength.

15. The metering pen of claim 1, wherein the plurality of magnets include permanent magnets.

16. The metering pen of claim 1, wherein the plurality of magnets include magnetizable materials.

17. The metering pen of claim 1, wherein the hollow body is non-magnetic.

18. The metering pen of claim 1, wherein the another magnet is a ring magnet disposed about the hollow body adjacent the valve seat.

19. The metering pen of claim 1, wherein a position of the another magnet relative to the hollow body is adjustable via a rotatable member.

20. The metering pen of claim 1, wherein the at least one magnet is coupled to a non-coiled spring and is movable in a direction towards the movable body by a slideable and/or rotatable member engageable with the non-coiled spring.

21. A metering pen for dispensing a medium onto a substrate, the metering pen comprising:
- a replaceable cartridge having a valve opening and a valve seat at an upstream side of the valve opening, the replaceable cartridge being insertable into and removable from the metering pen, wherein the replaceable cartridge contains:
  - the medium, and
  - a movable body configured to open the valve opening by moving out of engagement with the valve seat, and configured to close the valve opening by moving into engagement with the valve seat;
- a metering pore at a downstream side of the valve opening configured to release the medium from the replaceable cartridge onto the substrate; and
- a plurality of permanent magnets arranged outside of the replaceable cartridge and configured to move the moveable body within the replaceable cartridge, wherein at least one permanent magnet of the plurality of permanent magnets is arranged at an upstream side of the valve seat and another permanent magnet of the plurality of permanent magnets is arranged at a downstream side of the valve seat.

* * * * *